(12) United States Patent
Lewallen et al.

(10) Patent No.: US 10,430,080 B2
(45) Date of Patent: Oct. 1, 2019

(54) SUBSYSTEM STORAGE SPACE MANAGER

(71) Applicant: Apple Inc., Cupertino, CA (US)

(72) Inventors: Stephen Richard Lewallen, San Jose, CA (US); William M. Bumgarner, San Jose, CA (US); David A. Pound, San Jose, CA (US); Matthew D. Ricketson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/864,767

(22) Filed: Sep. 24, 2015

(65) Prior Publication Data

US 2016/0378354 A1 Dec. 29, 2016

Related U.S. Application Data

(60) Provisional application No. 62/186,326, filed on Jun. 29, 2015.

(51) Int. Cl.
*G06F 12/12* (2016.01)
*G06F 3/06* (2006.01)
*G06F 9/30* (2018.01)

(52) U.S. Cl.
CPC .......... *G06F 3/0608* (2013.01); *G06F 3/067* (2013.01); *G06F 3/0652* (2013.01); *G06F 9/30043* (2013.01)

(58) Field of Classification Search
USPC ......................................... 711/100, 154, 160
See application file for complete search history.

(56) References Cited

U.S. PATENT DOCUMENTS

| 5,893,920 A * | 4/1999 | Shaheen | G06F 12/0813 |
| | | | 707/E17.01 |
| 2003/0023826 A1 * | 1/2003 | McMichael | G06F 3/0601 |
| | | | 711/173 |
| 2003/0084368 A1 * | 5/2003 | Sprunt | G06F 11/1435 |
| | | | 714/6.31 |

(Continued)

OTHER PUBLICATIONS

Definition of Applet, Rouse 2017.*
Definition of application, Rouse 2007.*
Definition of Widget, Rouse 2015.*

*Primary Examiner* — Tuan V Thai
(74) *Attorney, Agent, or Firm* — Dickinson Wright RLLP

(57) ABSTRACT

The embodiments set forth techniques for managing storage space in user devices. A storage space manager can be configured to receive a request to increase an available amount of storage space within the user device, identify applications where at least a portion of the application's associated data can be deleted to increase the available storage space, determining particular applications whose identified associated data should be deleted, and causing the associated data to be deleted. According to some embodiments, applications managed by the storage space manager are not adapted to manage storage space themselves. Instead, these applications can be registered to the storage space manager and can be grouped into subsets that share sections of storage space within the user device. Moreover, the storage space manager can be a subsystem storage space manager that interfaces with a higher-level system storage manager that orchestrates storage space management within the user device.

20 Claims, 8 Drawing Sheets

(56) References Cited

U.S. PATENT DOCUMENTS

| | | | |
|---|---|---|---|
| 2003/0135859 A1* | 7/2003 | Putterman | H04L 12/2803 725/78 |
| 2003/0167318 A1* | 9/2003 | Robbin | G06F 1/1613 709/221 |
| 2005/0239494 A1* | 10/2005 | Klassen | G06F 8/62 455/550.1 |
| 2007/0186112 A1* | 8/2007 | Perlin | G06F 21/31 713/182 |
| 2007/0283081 A1* | 12/2007 | Lasser | G06F 12/0246 711/103 |
| 2008/0133525 A1* | 6/2008 | Ott | G06F 17/30053 |
| 2013/0185341 A1* | 7/2013 | Rajaram | G06F 3/0608 707/821 |
| 2014/0006465 A1* | 1/2014 | Davis | G06F 17/30194 707/827 |
| 2014/0179272 A1* | 6/2014 | Zhang | H04L 67/34 455/411 |
| 2016/0277537 A1* | 9/2016 | Liang | H04L 67/34 |
| 2017/0013289 A1* | 1/2017 | Nightingale | H04N 21/23113 |

\* cited by examiner

SUBSYSTEM STORAGE SPACE MANAGER

CROSS-REFERENCE TO RELATED APPLICATIONS

This application claims the benefit of U.S. Provisional Patent Application No. 62/186,326, filed on Jun. 29, 2015, which is incorporated by reference herein in its entirety for all purposes.

FIELD

The described embodiments set forth systems and techniques for intelligently managing storage space in user devices.

BACKGROUND

Generally, users tend to load their devices with large amounts of data (e.g., music, pictures, movies, games, etc.). At some point, there may not be enough storage space remaining in a user device to allow for additional data to be loaded. In other words, the user device may run out of storage space, which can lead to performance degradation.

Typically, when the user device runs out of storage space, the user device prompts the user to carry out a process that is aimed at freeing up storage space within the user device. For instance, the user can be presented with a dialog box indicating that the user device is out of storage space. In some cases, a list of applications installed on the user device is displayed and the user is asked to delete one or more of the applications (and their associated data). In this case, the user is imposed with making an uninformed decision regarding which applications to keep or delete in order to free up storage space. In another scenario, when the user device runs out of storage space, the user device can be configured to delete (recoverable) data associated with an application without consideration of the impact such an action would have on the user. For example, when all or a portion of the user's music library is deleted, it can be cumbersome for the user to wait while the music library is re-downloaded at a later time when he or she attempts to access songs for playback. Understandably, this can negatively impact the user's satisfaction with the user device.

In view of the foregoing, there is a need for a user device that is capable of intelligently freeing up storage space while preserving the best user experience possible.

SUMMARY

Representative embodiments set forth herein disclose various systems and techniques for intelligently managing storage space in a user device. In particular, the embodiments set forth various systems and techniques for allowing a storage space manager executing on the user device to manage storage space by (1) identifying applications on the user device for which their associated data (e.g., files or cache contents) can be deleted in order to free up storage space, (2) identifying application-specific data to be deleted, and (3) deleting the application-specific data, thereby freeing up storage space. According to some embodiments, the storage space manager can be triggered to carry out storage space management operations in a proactive manner (e.g., periodically) or in a reactive manner (e.g., in response to an available storage space threshold being satisfied, in response to receiving a command from other entities executing on the user device, and the like).

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for managing streaming video cache. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
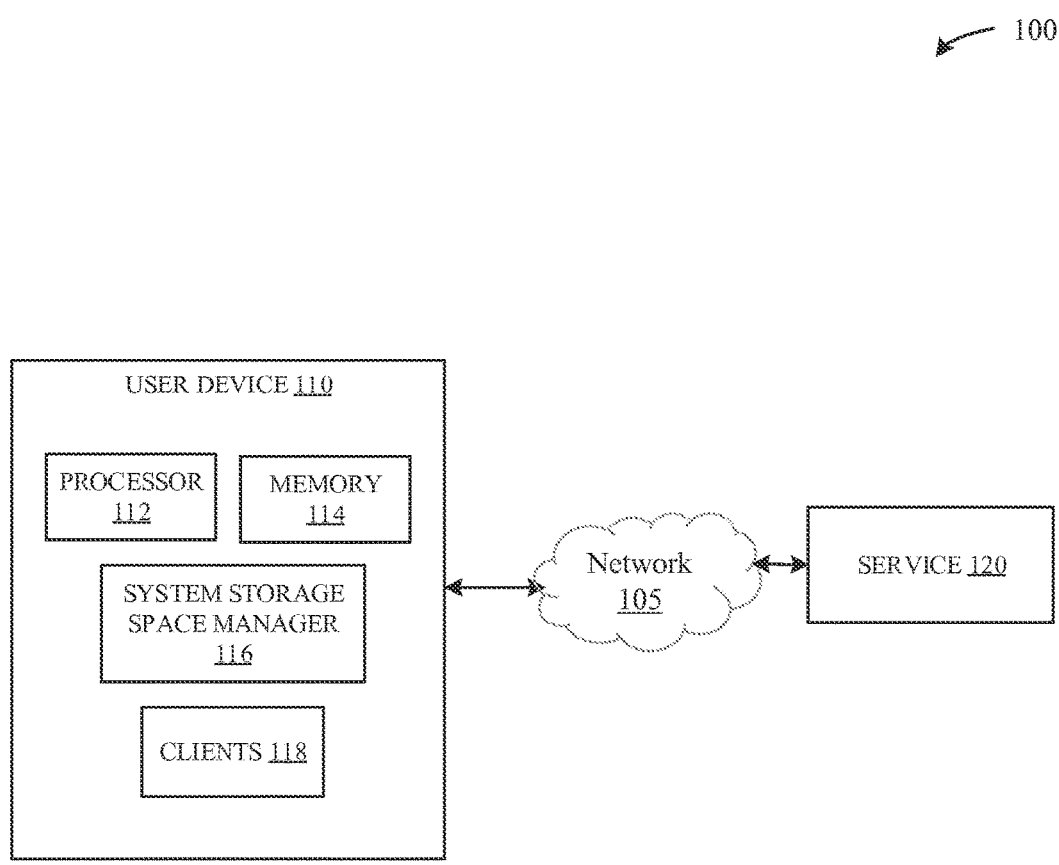
FIG. 1 illustrates in block diagram format exemplary components of a system configured to implement a storage space manager according to various embodiments of the present disclosure.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Individuals tend to utilize their user devices to take pictures, download applications, files, and/or other data, as well as play music, videos, and/or other types of media content. Notably, such usage typically consumes a considerable amount of storage space that is available on standard user devices (e.g., smartphones and tablets). Oftentimes, storage space on the user devices is limited and many users face the dilemma of running out of storage space. As previously noted herein, some user devices can be configured to display a list of applications running on the user device and prompt the user to make an uninformed decision regarding which applications or files to keep or delete in order to free up storage space. For obvious reasons, this can degrade overall user satisfaction as the user is imposed with making a decision that can be confusing and lead to undesirable results.

Accordingly, the embodiments set forth herein provide various systems and techniques for intelligently managing storage space in a user device. In particular, the embodiments set forth various systems and techniques for allowing a storage space manager executing on the user device to manage storage space by (1) identifying applications on the user device for which their associated data (e.g., files or cache contents) can be deleted in order to free up storage space, (2) identifying application-specific data to be deleted, and (3) deleting the application-specific data, thereby freeing up storage space. According to some embodiments, the storage space manager can be triggered to carry out storage space management operations in a proactive manner (e.g., periodically) or in a reactive manner (e.g., in response to an available storage space threshold being satisfied, in response to receiving a command from other entities executing on the user device, and the like).

According to some embodiments, the storage space manager can manage storage space for various applications that are registered with (i.e., known to) the storage space manager and that cannot manage their own storage space, at least with respect to deleting their associated data. In some embodiments, the storage space manager can be configured to delete associated application-specific data on behalf of its registered applications, e.g., where the storage space manager acts as a subsystem that answers to a higher-level system storage space manager that manages all aspects of storage within the user device. For example, the storage space manager can be a subsystem storage space manager that manages applications directed to providing media content (e.g., audio, video, photo, etc.), among other applications, on the user device, where the system storage space manager is configured to interface with the storage space manager and manage the storage space for the other applications installed on the user device. According to some embodiments, applications can be grouped into subsets that share the same storage space, and the storage space manager can manage storage space in accordance with the subsets. For example, if a configuration of the storage space manager dictates that a given application in a subset should not have its associated data deleted, then other applications included in the subset should not have their associated data deleted either.

Accordingly, the foregoing approaches provide systems and techniques for intelligently managing storage space in user devices. A more detailed discussion of these systems and techniques is set forth below and described in conjunction with FIGS. 1-8, which illustrate detailed diagrams of systems and methods that can be used to implement these systems and techniques.

FIG. 1 illustrates, in block diagram format, exemplary components of a system configured to implement a storage space manager according to various embodiments of the present disclosure. More specifically, FIG. 1 illustrates a high-level overview of the system 100, which, as shown, includes a user device 110 and a remote service 120 with which the user device 110 can communicate via a network 105. The user device 110 can represent a device having limited file storage capacity such as a mobile device (e.g., an iPhone®), a tablet device (e.g. iPad®), a laptop computer, a desktop computer, a digital television, a digital media recorder, a set top box, a media device, or any other suitable device capable of storing and/or providing media content playback. The network 105 can include one or more of the Internet, an intranet, a PAN (Personal Area Network), a LAN (Local Area Network), a WAN (Wide Area Network), a MAN (Metropolitan Area Network), a wireless communication network, and the like.

According to the illustration of FIG. 1, the user device 110 can include a processor 112, a memory 114, a system storage space manager 116, and a number of clients 118. The processor 112, in conjunction with the memory 114, is configured to execute the system storage space manager 116, the clients 118, and/or other applications (not shown) on the user device 110. The clients 118 can represent different applications that are installed on the user device 110 and with which a user of the user device 110 interacts. According to one embodiment, the clients 118 can include native or resident applications that are configured to run on a particular platform, such as clients developed for a mobile operating system (e.g., iOS or other operating system) configured to execute on the user device 110. According to one embodiment, one or more of the clients 118 can represent daemons that run as background processes rather than under the direct control of the user. As described in greater detail herein, daemons can be triggered into activity in response to an occurrence of an event/condition (for example, at a specific time/date, at periodic time intervals, or other events/conditions).

As described in greater detail herein, the system storage space manager 116 can be configured to request one or more of the clients 118 to free up storage space within the user device 110 (e.g., a cache of the user device 110 or a storage device accessible to the user device 110). In some situations, the system storage space manager 116 determines a total amount (i.e., a target amount) of storage space that ideally should be freed. The system storage space manager 116 then requests each client 118 of the one or more clients 118 to free up at least a portion of the total amount of storage space. Notably, within the context of the present disclosure, the requests to free up storage space are referred to as "deletion requests." In other words, the system storage space manager 116 is configured to communicate deletion requests to the one or more clients 118. In order to free up storage space, the clients 118 can respond to the deletion requests by deleting at least a portion of their associated data and/or by moving at least a portion of their data to a cloud-based service (for example, iCloud™ by Apple®), where the remote service 120 illustrated in FIG. 1 can represent such a cloud-based service.

In some situations, the clients 118 and the system storage space manager 116 implement a plugin-based approach. More specifically, each client 118 can represent a plugin that can 1) receive deletion requests from the system storage space manager 116, 2) carry out data management activities (e.g., deleting or moving data) in response to the deletion requests, and 3) report an amount of storage space that is freed up as a result of the data management activities. Each client 118 can also be configured to report an amount of storage space that currently is available to be freed up (by deleting associated data), which can allow for the amount to be discounted when displaying overall storage usage. It is noted that this plugin-based approach is merely exemplary, and that other approaches can be used without departing from the scope of this disclosure.

Figure 2:
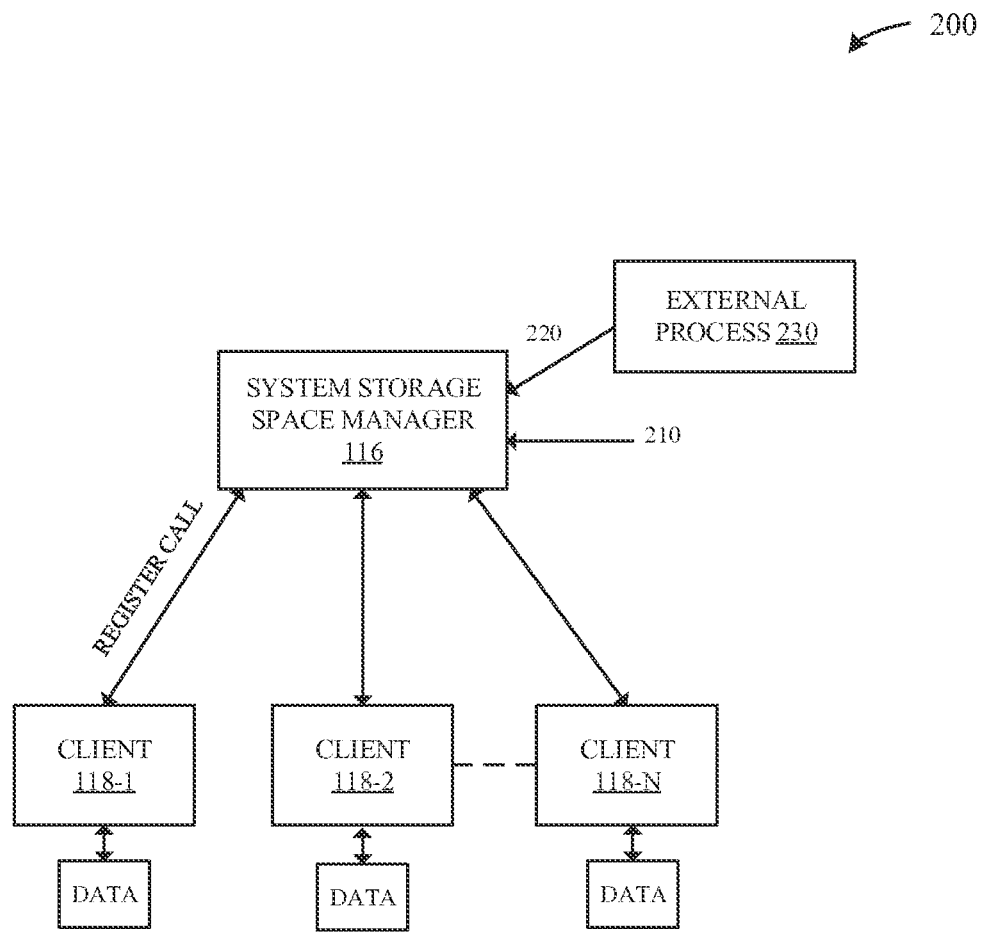
FIG. 2 illustrates in block diagram format a more detailed view of particular exemplary components of the system of FIG. 1 according to various embodiments of the present disclosure.

FIG. 2 illustrates in block diagram format a more detailed view of some of the exemplary components of the system of FIG. 1, according to various embodiments of the present disclosure. Specifically, FIG. 2 illustrates an arrangement 200, where each client 118 (e.g., client 118-1, client 118-2, . . . client 118-N) has its own associated data that consumes a certain amount of storage space within the user device 110. Thus, each client 118 has a first amount of storage space that is available and a second amount of storage space that is used. Clients 118-1 through 118-N can each represent a separate application installed on the user device 110, a native application that executes on the user device 110, or a daemon that runs as a background process on the user device 110. Each client 118 is configured to register with the system storage space manager 116. By registering with the system storage space manager 116, each client 118 agrees to participate in a protocol/procedure (as described below) used by the system storage space manager 116 that is directed toward freeing up storage space within the user device 110. According to one embodiment, each client 118 can register with the system storage space manager 116 by way of a static registration in a file system of the user device 110. More specifically, the static registration can provide information about the client 118 to the system storage space manager 116. According to another embodiment, each client 118 can register with the system storage space manager 116 dynamically when the client 118 is launched. For instance, when the client 118 is launched, the client 118 can issue a register call to register with the system storage space manager 116. The system storage space manager 116 can maintain the registration information associated with the registered clients 118, e.g., by causing the registration information to be stored in the file system. According to yet another embodiment, some of the clients 118 can be dynamically registered while others can be statically registered. Once registered, the clients 118 can receive the deletion requests from the system storage space manager 116 and provide responses to the deletion requests.

In various situations, the system storage space manager 116 can receive requests to free up storage space from various sources. For example, when the user device 110 has run out of storage space or when free storage space in the user device 110 falls below a particular threshold limit, a low storage notification may be generated by the user device 110. For example, the low storage notification can trigger a generation of a device request 210 for the system storage space manager 116. In some situations, the system storage space manager 116 can receive an external request 220 to free up storage space from an external process 230. The external process 230 can include a process that would require a particular amount of storage space available in order to proceed (for example, an OS update process, a software update process, a movie download process, etc.). For example, a movie download may trigger an external request 220 for the system storage space manager 116 to free up storage space, where the external request 220 is generated and provided to the system storage space manager 116 by the external process 230.

In response to a given device request 210 or external request 220 for more storage space, the system storage space manager 116 determines a total (i.e., target) amount of storage space to be freed. The system storage space manager 116 can make this determination in accordance with the requests 210/220. For example, if a movie download requires 7 GB of storage space and the user device 110 has only 1 GB of storage space available, the system storage space manager 116 can make a determination that 6 GB of storage space needs to be freed. In other words, the total amount of storage space that needs to be freed is 6 GB. In turn, the system storage space manager 116 can be configured to query each client 118 for the amount of storage space that the client 118 has available or the amount of storage space the client 118 can make available by deleting at least a portion of the associated data for client 118.

This initial inquiry can initiate an exchange that takes between the system storage space manager 116 and various clients 118 that may be capable of freeing up storage space within the user device 110. This exchange can include clients 118 initially reporting to the system storage space manager 116 an amount of available storage space they have, determining an amount of associated data that is to be deleted by each client 118 in a distributed manner, and sending deletion requests to one or more of the clients 118 to cause the one or more clients 118 to delete associated data to free up storage space, where, in turn, the one or more of the clients 118 can report back deletion result information. This exchange can further include sending further queries for available storage space at higher levels of urgency, the reporting of additional available space at the higher urgency levels, redistributing portions of associated data to be deleted for each client 118, sending additional deletion requests to the clients 118, and so forth. Various policies, rules, priorities, preferences, and/or protocols can be observed by system storage space manager 116 in making these inquiries, calculations, determinations, and demands regarding storage space for the various clients 118. These various factors can include system factors as well as individual policies and factors that might be specific for particular clients 118, and can include estimates or projections with respect to potential risks, problems, and/or likelihoods with deleting associated data for various clients 118. Further details regarding these factors and other features and processes of the different components described herein can be found in commonly assigned and co-pending U.S. patent application Ser. No. 14/500,926, entitled "INTELLIGENT STORAGE SPACE MANAGER," filed Sep. 29, 2014, which is incorporated by reference herein in its entirety.

Figure 3:
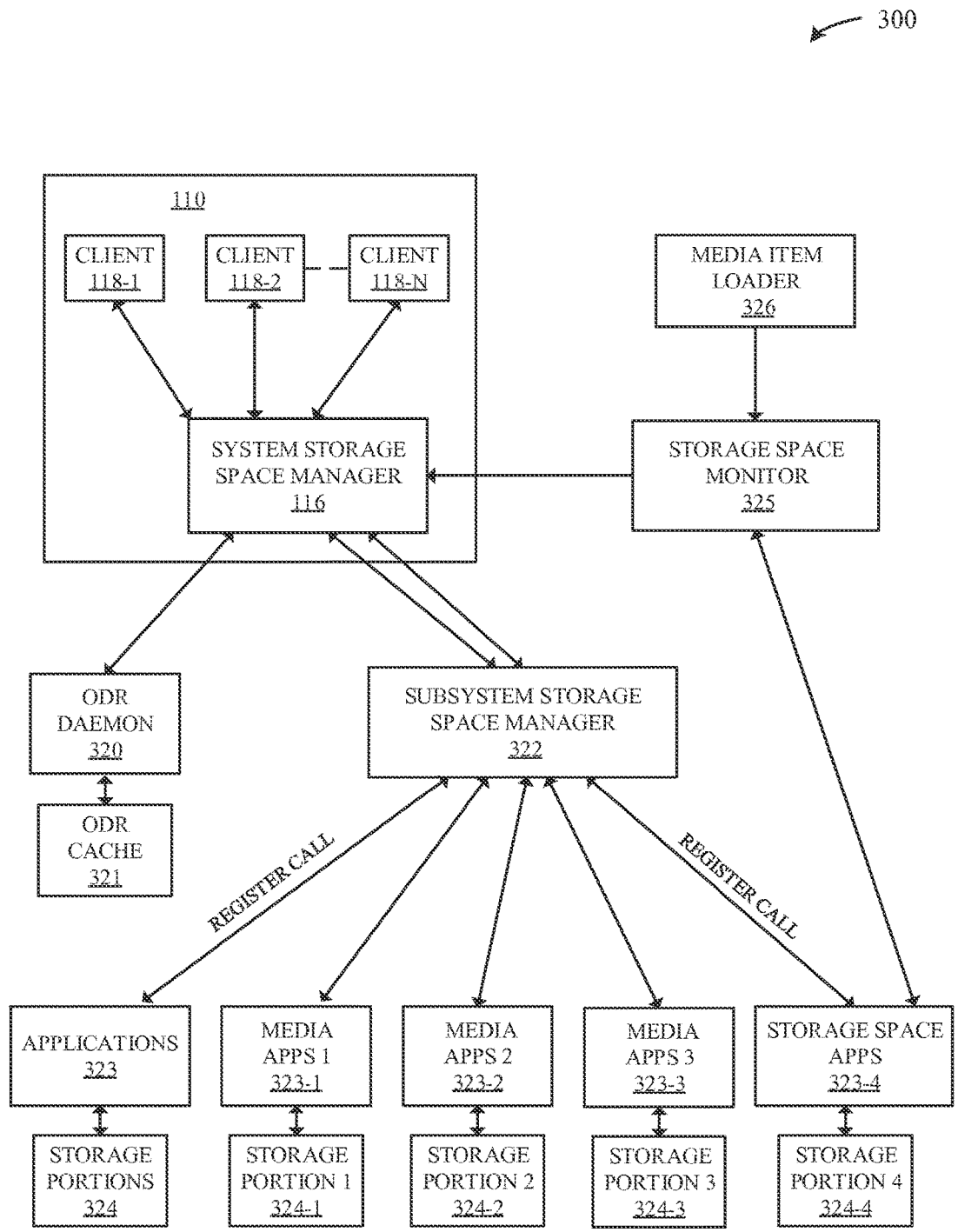
FIG. 3 illustrates in block diagram format a further detailed view of particular exemplary components of the system of FIGS. 1-2 according to various embodiments of the present disclosure.

Turning next to FIG. 3, a further detailed view of particular exemplary components of the system of FIGS. 1-2 is also provided in block diagram format. As shown in FIG. 3, an arrangement 300 similarly depicts the user device 110 implementing the system storage space manager 116 and a plurality of clients 118-1 to 118-N. Although exceptions or specific priorities may exist, system storage space manager 116 generally treats all of clients 118 equally in terms of allowing, prioritizing, and issuing deletion requests associated with storage space management. As described above, it will be appreciated that clients 118 can be applications, programs, services, files, and/or other entities that are able to control their associated data within memories (e.g., caches, solid state drives (SSDs), hard disks, etc. —referred to herein as "system storage") that are accessible to user device 110. According to some embodiments, the clients 118 can issue requests for more storage space to the system storage space manager 116, can write, read, and recycle their own data, and can delete their own data from the system storage to free up storage space, including in response to storage space deletion requests issued by the system storage space manager 116. Any such entity having the ability to manage its own storage space, including deleting its own data and making that storage space available to the system storage space manager 116 is termed a "client" for purposes of discussion herein. Such "clients" can be located on the user device 110, as in the case of illustrated clients 118-1 to 118-N, and may also be located remotely from the user device 110 in instances where a remote or separate entity utilizes storage space within the user device 110, is registered and interacts with the system storage space manager 116, and is able to delete or cause the deletion of its own associated data.

Other "non-client" applications, programs, files and/or other entities that require the use of storage space can continue to exist on user device 110, and possibly separately elsewhere, with such non-client entities generally being unable or unequipped to delete their own data from a system storage on user device 110. Such entities that use storage space but cannot interact with a system storage space manager to delete their own data or otherwise free up storage space can be termed "non-client applications" or just "applications" for purposes of discussion herein. In instances where the overall data or information stored on the system storage is small, such applications are generally not a significant problem. Where data used by such applications is large, however, such as in the case of an application (i.e., a non-client) that provides or uses audio/video (AV) content or other media content, substantial portions of storage space can remain unavailable long after that content has served its purpose. Accordingly, the disclosed embodiments also provide for efficient ways to manage storage space for such applications, which can be accomplished through the use of one or more subsystem storage space managers that manage storage space for multiple applications. In the event that a given subsystem manager deals only or primarily with streaming video and other AV content, for example, this could take the form of an audio/video subsystem storage space manager.

In addition to the user device 110 and its clients 118 and other components illustrated and described above, arrangement 300 in FIG. 3 also shows one or more services or service components for the user device 110. These can include an ODR (On Demand Resources) daemon 320 that can help to manage an ODR cache or portion of storage space 321 on behalf of various games, programs, apps, and other downloaded entities, as well as a subsystem storage space manager 322 that can help to manage disk space collectively for a plurality of applications 323. In various embodiments, each of ODR daemon 320, AV subsystem storage space manager 322, and/or any other similar subsystem storage space manager or service (not shown) reports to and is governed by the system storage space manager 116, which remains responsible for orchestrating storage space management for the user device 110. In this manner, system storage space manager 116 can be adapted to treat ODR daemon 320, subsystem storage space manager 322, and/or any other similar subsystem in a manner similar to the clients 118. That is, each of these entities can register with, communicate with, and execute commands and requests in conjunction with the system storage space manager 116 in a similar manner to the clients 118. Unlike the clients 118, though, these subsystem managers are configured to manage storage space collectively and by proxy for different applications/entities, which is described below in greater detail.

Subsystem storage space manager 322 might be used on or associated with the use of, for example, a digital media player, extender, or other media device, such as for television and/or other media (e.g., an Apple TV®). Although various details and functions are provided herein regarding specialized types of storage space management for subsystem storage space manager 322, it will be readily appreciated that these various details and functions could also be performed by another subsystem manager and/or even by system storage space manager 116 in some embodiments. Furthermore, such a subsystem storage space manager 322 can be located on the user device 110, or can be located remotely on a different device and provided as a service to the user device 110. For example, an Apple TV® might provide the services of an associated subsystem storage space manager 322 for a system storage on a separate computer, digital television, monitor, tablet, or other suitable user device 110.

In particular, subsystem storage space manager 322 can be adapted to help manage storage space by proxy for a plurality of applications 323 that cannot adequately manage storage space for themselves, such as to delete their data or otherwise free up storage space for other use. One or more storage space portions 324 can be associated with these applications 323, which can be done on a case by case basis. These applications 323 can be, as a non-limiting example, AV or other media applications, which tend to consume a considerable amount of storage space during normal operations. Examples of such AV applications can include a media downloader, a digital video recorder, a digital video playback application (e.g., for TV shows, movies, podcasts, music, radio, digital pictures), a TV source, menus, settings, screensavers, and web browsers, among many other AV or other media applications. Other non-media applications can also be managed by subsystem storage space manager 322. For example, subsystem storage space manager 322 can also manage a software updater and/or a settings module, among other possible non-media applications and programs. In fact, it is specifically contemplated that subsystem storage space manager 322 can manage storage space for a wide variety of applications 323, and not just AV or other media applications.

In some embodiments, subsystem storage space manager 322 can manage the storage space for all or most of the AV and other media applications that run on user device 110. At least some of the applications 323 having their storage space managed by subsystem storage space manager 322 can be termed "media apps" for purposes of discussion, and can be located on user device 110, remotely or separately from the user device 110, or in some combination thereof. Some or all of the various media apps and other applications from applications 323 to be managed can be grouped or otherwise organized or associated into various subsets for storage space management purposes, such as, for example, "media apps 1" application subset 323-1 through "media apps 3" application subset 323-3, although fewer or more application subsets can be formed. Each application subset 323-N can contain one or more media apps according to a grouping policy for subsystem storage space manager 322, and each application subset 323-N can be associated with a corresponding specific storage space portion 324-N from "storage portion 1" (324-1) through "storage portion 3" (324-3). While the depicted application subsets are labeled as media apps for purposes of illustration, it will be readily appreciated that one or more application subsets can include other non-media applications as well. In fact, an application subset may contain a plurality of applications that are all non-media applications in some embodiments.

In various embodiments, each application 323 or other entity that has its storage space managed or at least partially managed by subsystem storage space manager 322 must be registered with and thereby be in agreement with the various protocols and rules of the subsystem storage space manager 322. Such protocols and rules can include, for example, one or more designations of a specific storage space portion 324 that is to be used by a particular application 323. Where a particular application is part of an application subset 323-N, then its same specific storage space portion 324-N is also typically made available for use by all other applications within the application subset 323-N for that particular application. In addition, a registered and managed application 323 must accept that the subsystem storage space manager 322 is allowed to control storage space on behalf of the application 323, which may or may not include the use of any input or information from the application itself.

Because the various applications 323 are not registered with or equipped to deal with the system storage space manager 116, storage-based requests, demands, and other actions made by such applications are instead made with subsystem storage space manager 322, which can then negotiate or act on behalf of the various applications collectively with the system storage space manager 116. From the point of view of the system storage space manager 116, the subsystem storage space manager 322 acts and is treated like a single client that issues and receives requests, demands, inquiries, reports, and the like with the system storage space manager 116. In this manner, subsystem storage space manager 322 accepts deletion requests and other communications from system storage space manager 116 that apply across the registered applications 323. Subsystem storage space manager 322 also acts on its own on behalf of the registered applications 323 collectively to calculate total available storage space for the storage space that is managed by the subsystem storage space manager 322, identify registered applications 323 that can provide storage space, determine portions of associated data to be deleted for one or more of the registered application 323, and cause the portions of the associated data to be deleted in order to free up storage space within the user device 110.

Similar to the foregoing examples with respect to clients 118 and system storage space manager 116, a given application 323 can register with subsystem storage space manager 322 by including a static registration in a file system managed by the user device 110. The static registration provides information about the application 323 to the subsystem storage space manager 322. Alternatively, an application 323 can register with the subsystem storage space manager 322 dynamically when the application 323 is launched, such as by making a register call to register with the subsystem storage space manager 322. The subsystem storage space manager 322 can maintain the registration information associated with the registered applications 323, and can cause the registration information to be stored in the file system. Some embodiments can include applications 323 that are statically registered and other applications 323 that are dynamically registered.

One particular advantage that can be realized through the use of a subsystem storage space manager 322 as described above, is that storage space management can be accomplished for applications that are not even running or active. For example, a given application 323 that is managed by subsystem storage space manager 322 can have data stored on the storage space per ordinary operations, and then later exits or stops running. When a cache deletion request is made at a later time, it is not necessary for that given application 323 to launch in order for its data to be deleted, since subsystem storage space manager 322 is able to delete the data on behalf of that given application, if desired.

In addition to subsystem storage space manager 322, a storage space monitor 325 can also be included in arrangement 300. Storage space monitor 325 can function in association with a media item loader 326 that is adapted to download or otherwise provide AV or other media content to user device 110, such as onto a system storage of the user device 110. This storage space monitor 325 can receive a communication from media item loader 326 indicating that the loader requires a particular amount of cache or storage space for loading a given media item to the user device 110. Storage space monitor 325 can then place a corresponding storage space request directly with the system storage space manager 116, or alternatively with the subsystem storage space manager 322, to designate a desired amount of storage space to reserve or promise to the media item loader 326. In some embodiments, such reservations/promises can remain intact so long as the media item loader 326 or one or more other applications associated with the media item loader 326 remain active. For example, the media item loader 326 may indicate that it wants 10 GB of storage space or cache in order to download a movie (e.g., in response to receiving a request from a movie playback application). The storage space monitor 325 can then reserve 10 GB of storage space with the system storage space manager 116 or subsystem storage space manager 322 so long as either of the media item loader 326 or the movie playback application remains active. Such a large space reservation onto local cache or storage space can facilitate better AV playback, rewind, fast forward, and other associated functions on the user device 110, for improved user experience. In some situations, the designated desired amount of space can represent the space needed to store the entire movie or media item, while in other situations the desired amount can represent enough space to store a significant portion or track of the movie or other media item.

After making its initial request or reservation, upon which system storage space manager 116 or subsystem storage space manager 322 is apprised of and may "promise" to keep available the requested amount of storage space, the storage space monitor 325 may then monitor the system storage. This can take place on an ongoing constant or periodic basis to monitor the status of the system storage and/or associated cache on user device 110 to determine the amount of storage space that is available for media item loader 326 and possibly one or more associated applications that will use that space. In the event that the available amount of storage space approaches or falls below the desired amount, the storage space monitor 325 can generate a request to free up storage space and send that request to system storage space manager 116, or subsystem storage space manager 322, if appropriate, which can then utilize its regular protocols to free up space from its clients and subsystems. Approaching the desired amount can mean that the available amount of storage space has fallen below a threshold amount that is still above the desired amount. This monitor and request process can typically serve to keep the desired amount of storage space free throughout operation of the media item loader 326 and possibly one or more associated applications. In some embodiments, the storage space monitor 325 can facilitate or force an alert, a pause, and/or other stoppage of the media item loader 326 and/or other associated application(s) when the available amount of storage space falls below the desired amount or some other critically low threshold and attempts to free up space have been unsuccessful.

Alternatively, or in addition, the storage space monitor 325 can have or utilize one or more storage space applications 323-4 that are registered with the subsystem storage space manager 322 and that have an associated specific storage space portion 324-4. This specific storage space portion 324-4 may form some or all of the storage space to be used to satisfy the desired amount of storage space determined and requested by storage space monitor 325. In some instances, additional storage space outside storage space portion 324-4 may be required to satisfy the desired amount. In some embodiments, a storage space application 323-4 may request storage space from subsystem storage space manager 322 for the storage space monitor 325, which can then request storage space from system storage space manager 116 on behalf of the storage space application and associated storage space monitor. In various embodiments, media item loader 326 and storage space monitor 325 may not be registered as clients with system storage space manager 116. Consequently, these components may not be able to delete their own data or otherwise free up storage space on the system storage. In this scenario, storage management activities for media item loader 326, storage space monitor 325, and/or one or more associated applications can then be performed by the subsystem storage space manager 322, such as by way of storage space application(s) 323-4.

Figure 4:
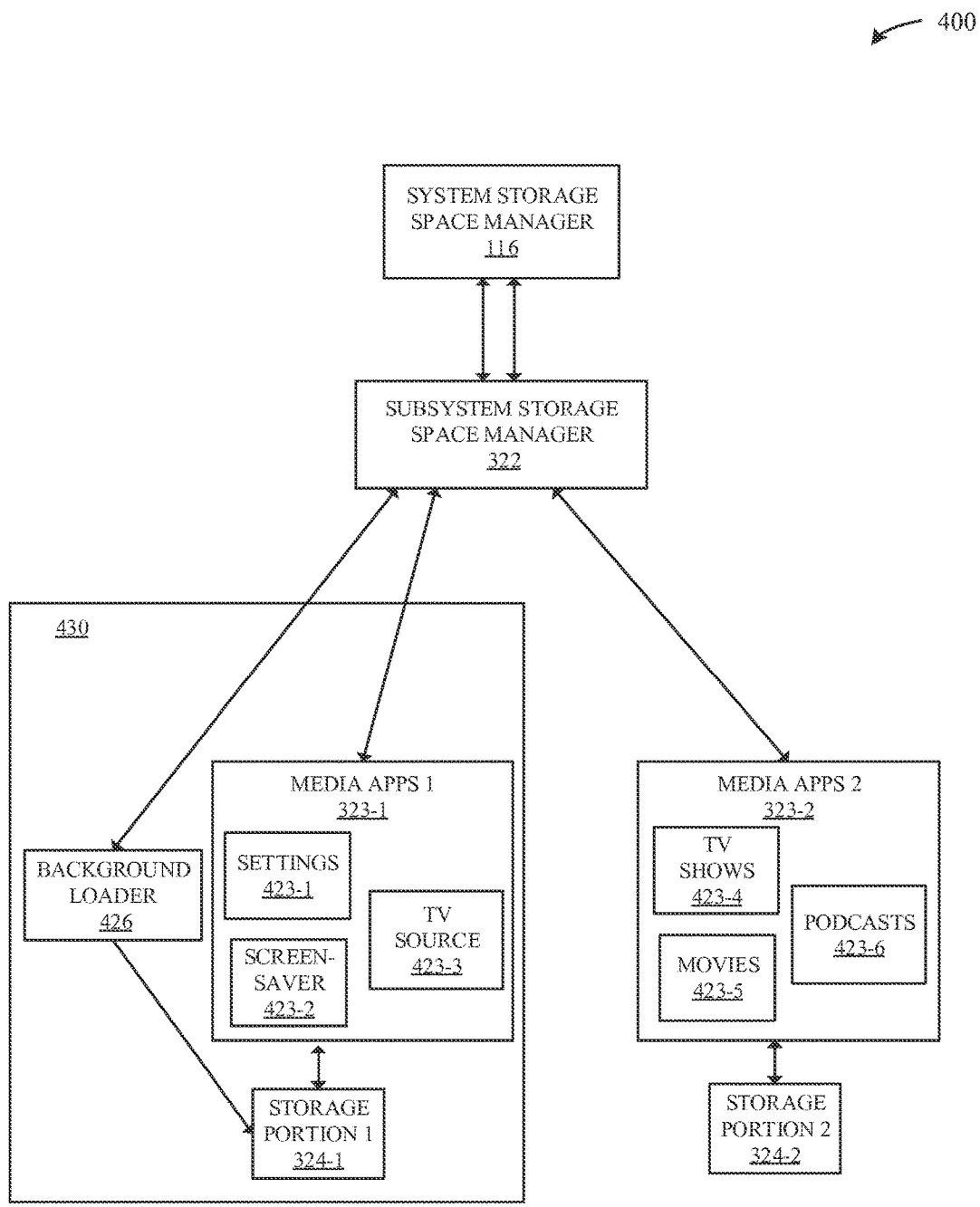
FIG. 4 illustrates in block diagram format a still further detailed view of particular exemplary components of the system of FIGS. 1-3 according to various embodiments of the present disclosure.

Continuing with FIG. 4, an even further detailed view of particular exemplary components of the system of FIGS. 1-3 is also provided in block diagram format. Arrangement 400 similarly focuses on certain specific aspects of the system 100. As previously shown and discussed, subsystem storage space manager 322 can be in communication with and be subject to or governed by system storage space manager 116. Various communications between system storage space manager 116 and subsystem storage space manager 322 can involve registrations, requests to make storage space available, storage space inquiries, deletion reports, and storage space activity reports, among other requests and commands. Although subsystem storage space manager 322 manages storage space collectively and by proxy for numerous other applications 323, system storage space manager 116 can see and treat the subsystem storage space manager 322 just like an ordinary single client in its own ordinary management of the system storage. Accordingly, subsystem storage space manager 322 can be adapted to manage multiple storage space requests altogether and at once, such as by combining individual space requests into fewer but larger space requests. The provided freed up storage space can then be managed and doled out accordingly by subsystem storage space manager 322 without system storage space manager 116 needing to know how different applications 323 are using storage space. Subsystem storage space manager 322 can track this specific information, and can delete (or cause deletion of) data within its managed storage space in order to free up storage space in response to the deletion requests. Subsystem storage space manager 322 can then report the freed up storage space to the system storage space manager 116, where the report can include location information that describes the freed up storage space.

Arrangement 400 in FIG. 4 depicts additional details with respect to two specific groupings or application subsets 323-1 and 323-2. A "media apps 1" application subset 323-1 can include several specific applications, such as, for example, a settings application 423-1, a screensaver application 423-2, and TV source application 423-3, among other possible applications. A "media apps 2" application subset 323-2 can include other specific applications, such as, for example, a TV playback application 423-4, a movie playback application 423-5, and a podcast application 423-6, among other possible applications. Further application subsets not shown can similarly include other specific applications. Subsystem storage space manager 322 can be in communication with or at least in receipt of data or information with respect to each of these specific applications 423-1, 423-2, 423-3, 423-4, 423-5, and 423-6, as well as other possible applications that may be within application subsets 323-1, 323-2, and/or other application subsets that are not presently shown.

Specific media applications 423-1, 423-2, 423-3, along with any other non-media applications within application subset 323-1, can be associated or designated for use with a specific storage space portion 324-1, while applications 423-4, 423-5, 423-6, and any other applications within application subset 323-2 can be associated or designated for use with a separate and different specific storage portion 324-2. In various embodiments, applications 423-1, 423-2, 423-3, and any other applications within application subset 323-1 can be similar to or relate to each other in some way. This can similarly be the case for applications 423-4, 423-5, and 423-6, for any other applications within application subset 323-2, as well as any applications that can be grouped together in a particular application subset. For example, applications 423-1, 423-2, and 423-3 might all be configured to use the same photos, pictures, and/or other types of media items for their various application functions. These same media items can all be located on shared storage space portion 324-1, such that any of applications 423-1, 423-2, and 423-3 are able to access and use these same media items on this same shared storage space portion as may be desired by the application. Shared usage of the same or similar media assets across many applications in this manner can then be a factor in the collective management of storage space by subsystem storage space manager 322.

In various embodiments, it can be preferable that storage space is not freed up for any client, application, or other entity that is currently active. Self-managing clients 118 may refuse to make available any storage space when they are currently active, and it may be prudent not to disturb a given application 323 by freeing up storage space when the application is currently active. Accordingly, one rule or protocol for subsystem storage space manager 322 can be to identify a given registered application 323 as being not available to provide storage space when the application is currently active. Such identification can be made because of a storage space deletion request that has been received by the subsystem storage space manager 322. For example, system storage space manager 116 might issue a storage space deletion request to subsystem storage space manager 322, whereupon the subsystem storage space manager 322 can respond in part by identifying all currently active applications as being not available to provide storage space. The subsystem storage space manager 322 may instead identify one or more other applications that are currently inactive as being available to provide storage space in some instances.

Because specific applications 423-X within a given application subset 323-N may all tend to share media assets or other data or items on the shared storage space portion 324-N, it may also be prudent not to disturb any application within an application subset (e.g., by freeing up storage space) when any other application that is also within that application subset is currently active. For example, while a settings application 423-1 and a TV source application 423-3 may be currently inactive, a screensaver application 423-2 might be currently active and accessing pictures on storage space portion 324-1, where these pictures are also used by the settings application 423-1 and the TV source application 423-3 for various functions of those applications. It may thus be undesirable to free up storage space associated with currently inactive applications 423-1 and 423-3, since doing so could significantly affect currently-active application 423-3, due at least to their sharing arrangements of storage space portion 324-1. Similar examples can apply for specific applications 423-4, 423-5, and 423-6 within application subset 323-2, all of which share storage space portion 324-2, as well as for any other application subset and its associated applications and storage space portion. Hence, another rule or protocol for subsystem storage space manager 322 can be to identify a given registered application 323 (or 423-N) as being not available to provide storage space when the application is in an application subset having another application that is currently active (e.g., currently running or performing operations at the user device 110).

In various embodiments, one or more additional entities may also be associated with a given application subset 323-N and its specific storage portion 324-N. For example, an entity association 430 can include the media apps 1 application subset 323-1 and its associated storage space portion 324-1, as well as a background loader 426 that is not a part of the media apps 1 application subset 323-1. According to some embodiments, background loader 426 can be registered and in communication with subsystem storage space manager 322, and can be configured to perform one or more operations with respect to specific storage portion 324-1. For example, background loader 426 can load pictures, videos, and/or other media content to storage portion 324-1, and possibly also one or more other specific storage portions 324-N. It therefore also may be desirable to prevent deletions or free ups for any of the applications 423-1, 423-2, or 423-3 within application subset 323-1 whenever associated background loader 426 is active. Thus, yet another rule or protocol for subsystem storage space manager 322 can be to identify an application as being not available to provide storage space when the application is in an entity association with any other entity that is currently active. Various modifications or conditions for such a rule or protocol can also be implemented, such as where it might be possible to determine exactly where background loader 426 or another associated entity is currently active. If it can be determined that the background loader 426 or other associated entity is not currently operating with respect to specific storage space portion 324-1, then such a condition might allow applications 423-1, 423-2, and/or 423-3 to be identified as being available to provide storage space.

Again, it will be readily appreciated that subsystem storage space manager 322 is not limited to managing only AV or media applications, but rather can be far more general with respect to managing other non-AV and non-media applications and programs. Accordingly, the foregoing examples that discuss media applications are merely illustrative and non-limiting. For example, a software updater may register with the subsystem storage space manager 322 so that a software update can be pre-downloaded to storage space managed by the subsystem storage space manager 322. The pre-downloaded software update can then be deleted at a later time as needed by the subsystem storage space manager 322. Other similar examples may apply for many other non-media applications and programs.

Figure 5:
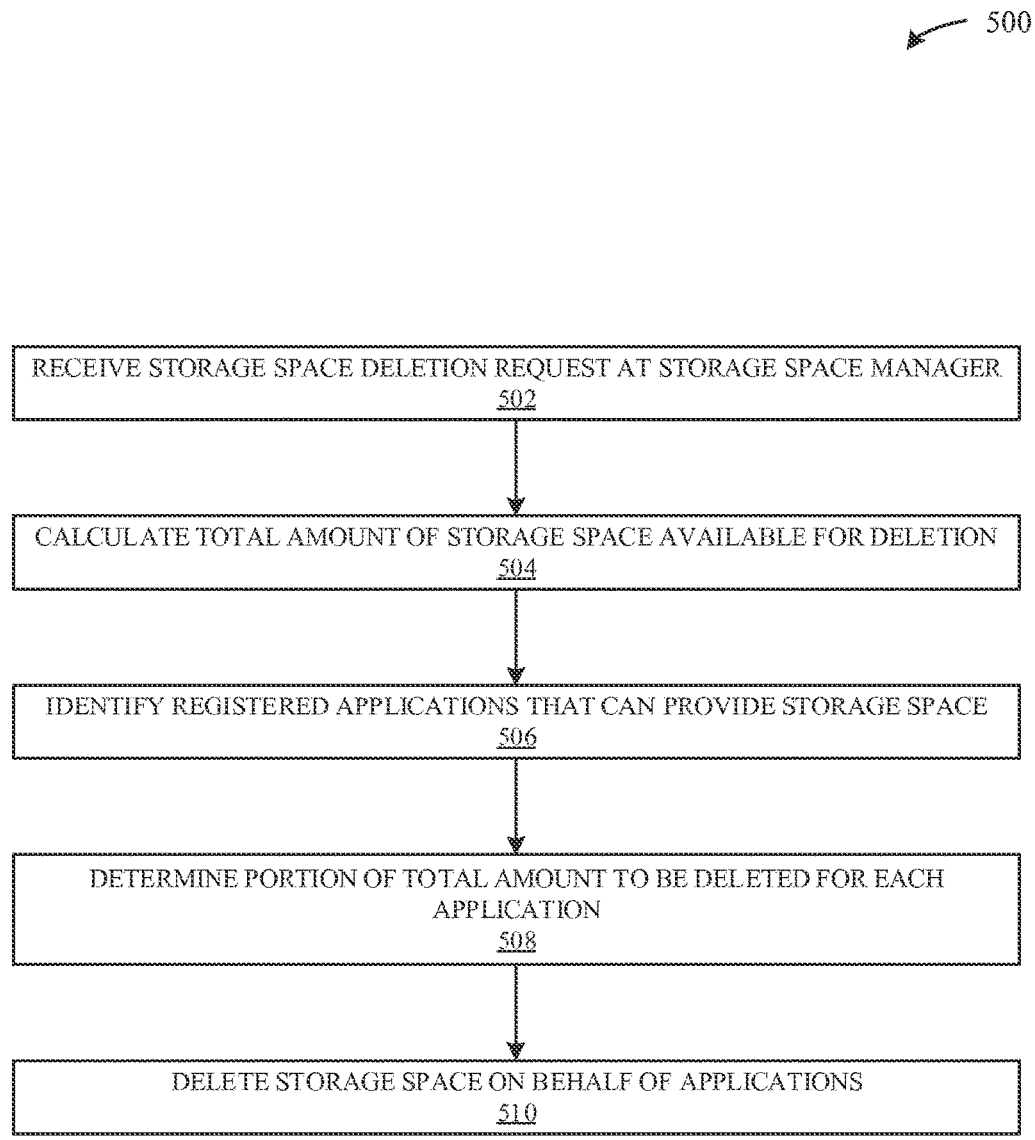
FIG. 5 illustrates a flowchart of an exemplary method performed by a storage space manager for managing storage space according to various embodiments of the present disclosure.
Figure 6:
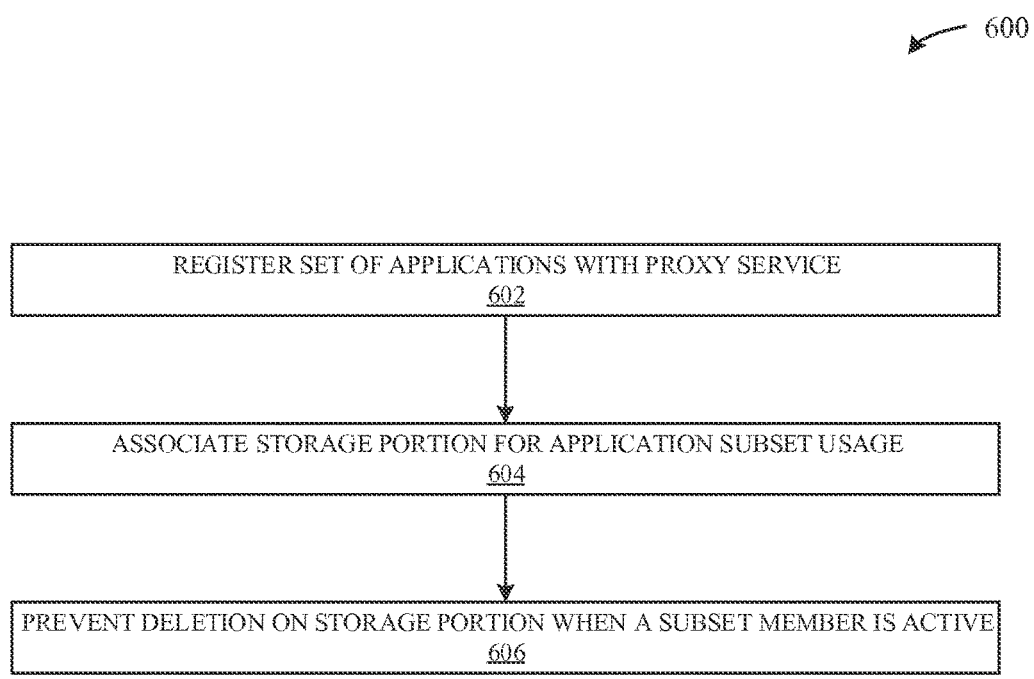
FIG. 6 illustrates a flowchart of an exemplary method performed by a proxy service for managing cache memory on a user device according to various embodiments of the present disclosure.
Figure 7:
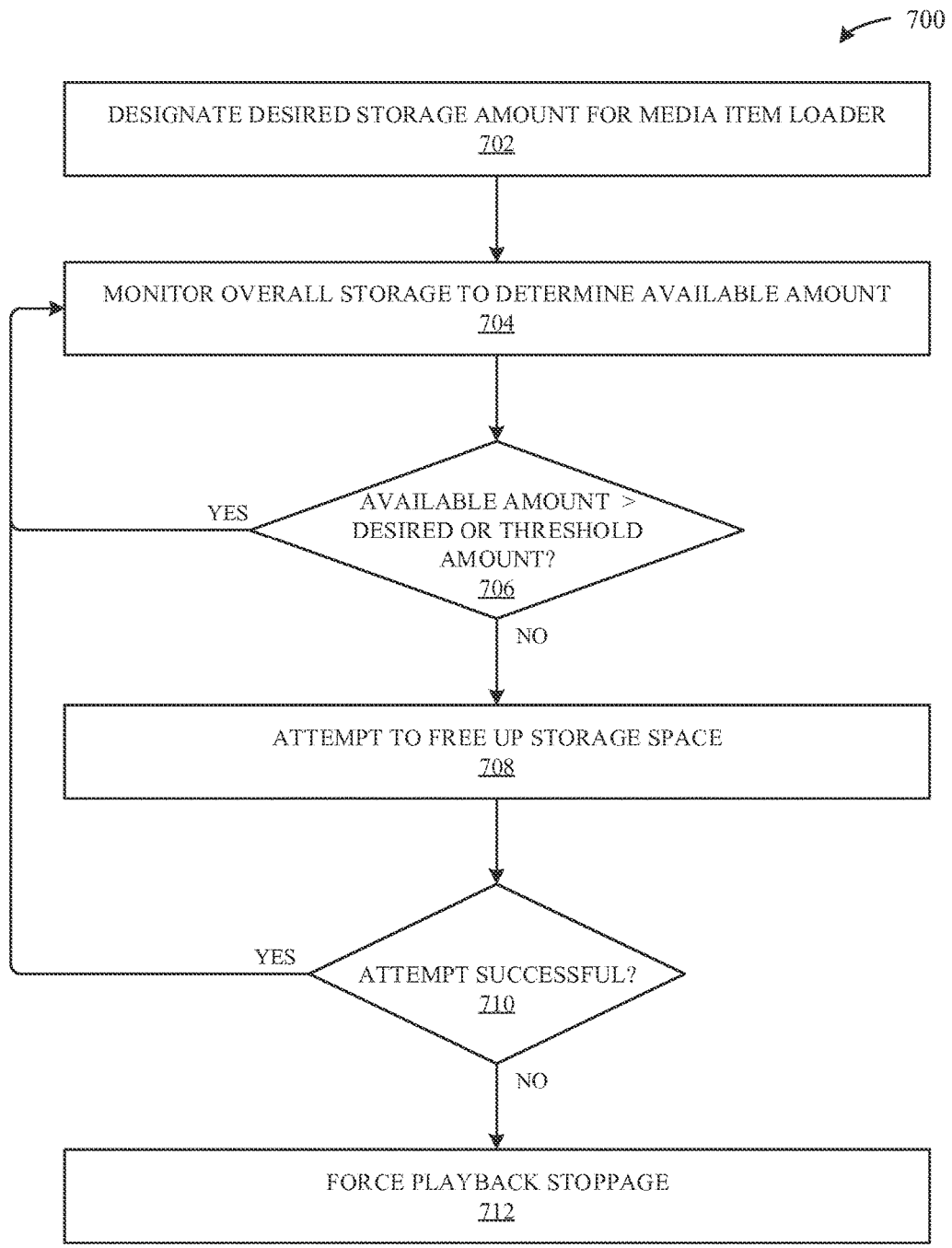
FIG. 7 illustrates a flowchart of an exemplary method performed by a storage space monitor for monitoring storage space and related activity according to various embodiments of the present disclosure.

Moving next to FIGS. 5-7, various methods of managing storage space according to the disclosed embodiments will now be provided. FIG. 5 illustrates a flowchart of an exemplary method performed by a storage space manager for managing storage space. As shown, method 500 begins at step 502, where the subject storage space manager receives a storage space deletion request. In various embodiments, this storage space deletion request might come from any component, service, or entity for any reason, and the receiving storage space manager can be any entity configured to manage storage space, such as a system storage space manager 116 or a subsystem storage space manager 322 as set forth above, among other possible storage space managers. In various particular embodiments, the storage space deletion request can be sent from a system storage space manager and received by a subsystem storage space manager, such as subsystem storage space manager 322.

At step 504, the subject storage space manager, which can be subsystem storage space manager 322, calculates a total amount of storage space that is available to be freed up (i.e., by deleting associated data). This total amount of storage space can be less than, more than, or equal to any specific amount of storage space that might have been requested in the storage space deletion request. The storage space deletion request can be part of an overall inquiry or request by and/or to multiple storage space managers, clients, and/or applications. As a specific example, a system storage space manager can send out storage space deletion requests to some or all of its clients and subsystem storage space managers. Accordingly, the total amount of storage space that can be made available can be calculated by a subsystem manager that is managing only a portion of the overall system storage, such as subsystem storage space manager 322 that is managing its storage space on behalf of a plurality of applications 323. This calculated total can reflect only what the subsystem manager is able to provide from its managed applications in response to the storage space deletion request that it has received, where the system manager can receive other storage space deletions from other clients and/or subsystem managers.

At step 506, the storage space manager identifies one or more applications that can provide storage space (i.e., delete data or otherwise free up storage space). This can include identifying one, some, or all of the applications registered with the storage space manager as being available or not available to provide storage space. For example, subsystem storage space manager 322 may identify one or more applications 323 that are currently active or that are in an application subset 323-N with another currently active application as being not available to provide storage space. As another example, the storage space manager may identify one or more applications that are currently inactive and recently have not been capable of providing additional storage space.

At step 508, the storage space manager determines a portion of the total amount of data to be deleted from storage space for each of the applications that are identified as available to provide storage space. This determined portion to be deleted for each identified application can be some or all of the space that might be available for that application. Determining storage space portions to be freed up for each different application can be done in a distributed manner by the storage space manager in order to spread out the overall impact, to provide larger deletion amounts for those applications that have more available space, and/or according to one or more sets of protocols, procedures, formulas, and the like. In various specific embodiments, the storage space manager can be subsystem storage space manager 322, and the various storage space portion amounts to be freed up can be distributed or otherwise assigned according to application subsets and their associated specific storage space portions.

At step 510, the storage space is freed up accordingly on behalf of the identified applications, upon which method 500 finishes. This can be done by the storage space manager itself, or the deletion can be caused by the storage space manager. Again, this can specifically be subsystem storage space manager 322, which can be operating on behalf of one or more registered applications 323 and/or application subsets 323-N.

FIG. 6 illustrates a flowchart of an exemplary method performed by a proxy service for managing cache memory on a user device according to various embodiments of the present disclosure. In various embodiments, the proxy service can be a storage space manager, such as subsystem storage space manager 322, and the cache memory can reside on a system storage. Other proxy service entities and/or cache alternatives might also be used. As shown in FIG. 6, method 600 starts at step 602, where a set of applications are registered with the proxy service. In general the applications are registered to allow the proxy service to manage their usage of system cache or other suitable memory on their behalf. In some embodiments, this can include a plurality of applications 323 that are registered with the subsystem storage space manager 322, as described in the foregoing examples. Again, these applications can include media applications, non-media applications, or a mix of media and non-media applications.

At step 604, a specific portion of cache memory can be associated with or designated for shared use by a subset of the applications from the overall registered set. This association and monitoring thereof can be accomplished by the proxy service. In specific embodiments, this arrangement can include or be similar to that which is described above regarding one or more registered applications 323, which can be included in an application subset 323-N and therefore associated with shared storage space portion 324-N, as well as the subsystem storage space manager 322 that manages all of these items.

At step 606, any potential deletion on the associated cache memory portion is prevented whenever any application that is a member of the subset of media applications is currently active. Again, this prevention can be accomplished by the proxy service, which can be configured to prevent all deletions on the associated cache memory portion whenever any application subset member is currently active. In some embodiments, this can involve or correspond to the subsystem storage space manager 322 identifying applications 323 as not being available to provide (i.e., free up) storage space for any and all applications from an application subset 323-N where any application member of the application subset is currently active.

FIG. 7 illustrates a flowchart of an exemplary method performed by a storage space monitor for monitoring storage space and related activity according to various embodiments of the present disclosure. Method 700 can be carried out specifically by storage space monitor 325 on behalf of media item loader 326, for example. Method 700 starts at step 702, where a desired cache or storage space amount for an associated entity, such as a media item loader 326, can be designated by the storage space monitor 325. This designation can be made pursuant to input from the media item loader 326 or other associated entity. This designation can also involve providing an associated storage space manager with a storage space request or reservation, such that the storage space manager is aware of the desired cache or storage space amount. This can be, for example, system storage space manager 116 in the foregoing embodiments.

At step 704, the storage space monitor then monitors the overall cache or system storage to determine an available free space that is available. This can be done as an ongoing monitoring process, or at designated time intervals where space availability inquiries can be made and updates provided. This monitoring can be done so long as the media item loader and/or one or more other associated applications or entities all remain active, for example.

At decision step 706, an inquiry is made as to whether the available amount of free space on the storage exceeds the desired amount designated in step 702. Alternatively, or in addition, this inquiry can be made with respect to the available amount decreasing and approaching the desired amount, and/or with respect to a threshold amount that is somewhat higher than the desired amount. If the available amount of storage space exceeds the desired amount and/or other threshold amount, then the method reverts back to step 704 where monitoring can continue.

If the available amount of storage space falls below the desired and/or other threshold amounts, however, then the method moves to step 708, where the storage space monitor attempts to facilitate the deletion or freeing up of cache or storage space. This can be done, for example, by sending a storage space request directly to a storage space manager, such as system storage space manager 116. This can also be accomplished by having one or more associated clients or subsystem storage space managers also attempt to free up storage space. As a specific non-limiting example, the storage space monitor 325 could also arrange for the subsystem storage space manager 322 to send a storage space request to the system storage space manager 116 on behalf of itself or another application, such as by way of storage space application(s) 323-4.

At decision step 710, an inquiry is made as to whether the attempt to free up cache or storage space by the asset storage space monitor was successful. If so, then the method reverts back to step 704, where monitoring can then resume. If not, however, then the method can continue to step 712, where a media playback stoppage and/or one or more other remedial actions can be taken, such as what might be instigated or forced by the asset storage space monitor. Such other remedial actions could include, for example, an alert, a pause, and/or other stoppage of the media item loader and/or other associated application(s). This can take place either when the available amount of storage space falls below the desired amount or some other critically low threshold and attempts to free up space have been unsuccessful.

For the foregoing flowcharts, it will be readily appreciated that not every step provided is always necessary, and that further steps not set forth herein may also be included. For example, added steps that involve specific calculations or distributions of deletion amounts may be added. Also, steps that provide more detail with respect to various system components or features could also be added. Furthermore, the exact order of steps may be altered as desired, and some steps may be performed simultaneously.

Figure 8:
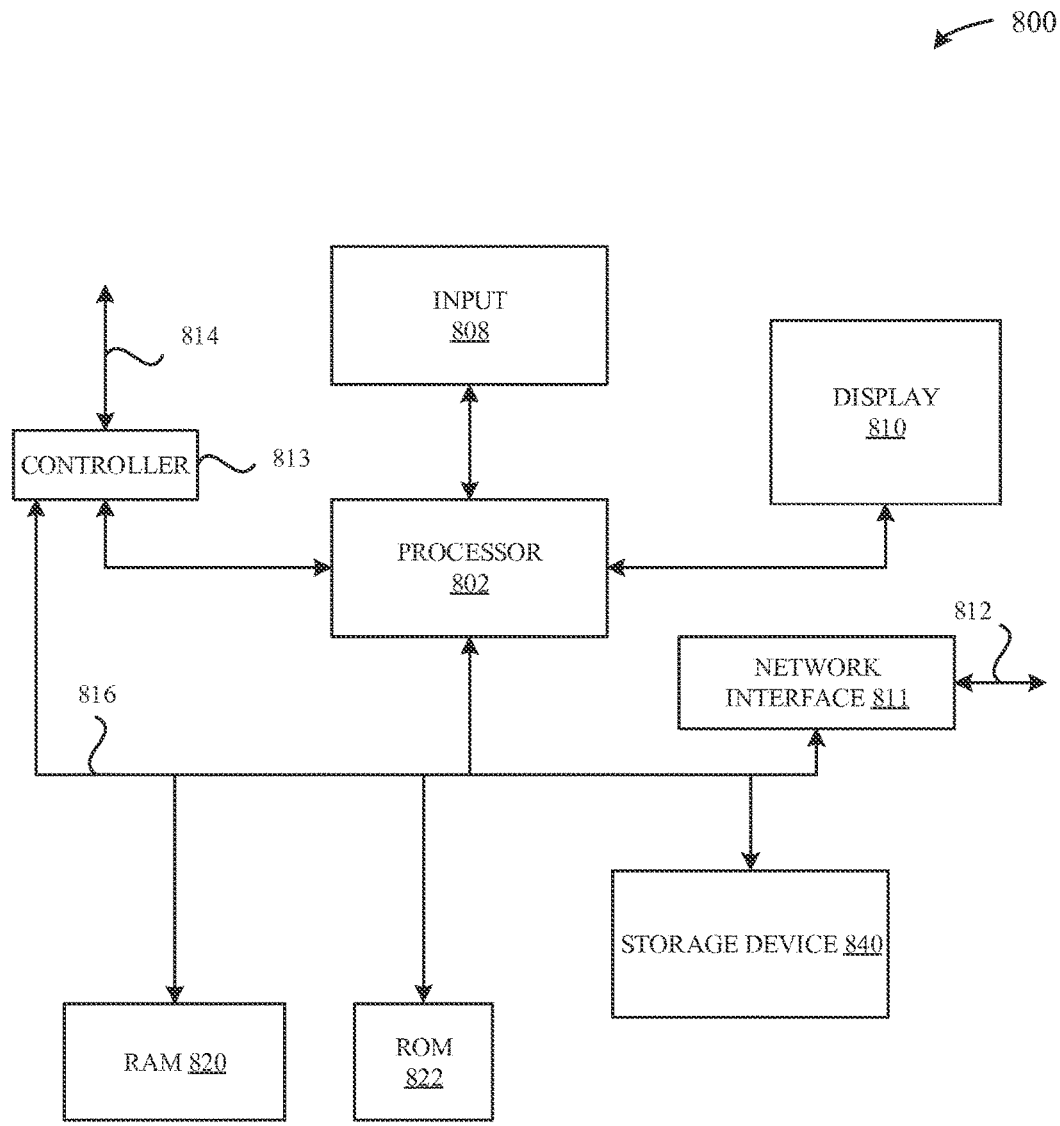
FIG. 8 illustrates in block diagram format an exemplary computing device that can be used to implement the various components and techniques described herein according to various embodiments of the present disclosure.

FIG. 8 illustrates in block diagram format an exemplary computing device 800 that can be used to implement the various components and techniques described herein, according to some embodiments. In particular, the detailed view illustrates various components that can be included in the user device 110 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/ image capture input interface, input in the form of sensor data, etc. Still further, the computing device 800 can include a display 810 (screen display) that can be controlled by the processor 802 to display information to the user (for example, a movie or other AV or media content). A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. At least one non-transitory computer readable storage medium configured to store instructions that, when executed by at least one processor included in a user device, cause the user device to implement a subsystem storage space manager to a system storage space manager configured to carry out steps that include:
    receiving a storage space deletion request from the system storage space manager, wherein the storage space deletion request indicates an amount of storage space to be freed on the user device;
    identifying, among a plurality of applications, one or more applications whose respective data can be deleted, wherein:
        the one or more applications are identified by way of a protocol that is defined by the system storage space manager and that is implemented by each application of the one or more applications, and
        each application of the one or more applications registers with the subsystem storage space manager and agrees to abide by the protocol;
    issuing, by way of the protocol, and for each application of the one or more applications, a respective deletion request that, when executed, causes a respective amount of the respective data of the application to be deleted without requiring an involvement of the application, wherein:
        the respective amounts of respective data, when deleted, cause at least the amount of storage space to be freed on the user device, and
        at least one application of the one or more applications is not executing on the user device when its respective data is deleted.

2. The at least one non-transitory computer readable storage medium of claim 1, wherein the system storage space manager provides an overall management of storage space available within the user device.

3. The at least one non-transitory computer readable storage medium of claim 2, wherein the storage space deletion request is received from the system storage space manager.

4. The at least one non-transitory computer readable storage medium of claim 2, wherein either the system storage space manager or the subsystem storage space manager is configured to carry out steps that include:
    receiving a request for a desired amount of storage space to be made available for a particular activity;
    monitoring available storage space within the user device to determine whether the desired amount of storage space can be provided; and
    when the desired amount of storage space can be provided:
        facilitating a deletion process that causes the desired amount of storage space to be made available for the particular activity.

5. The at least one non-transitory computer readable storage medium of claim 4, wherein the system storage space manager or the subsystem storage space manager is further configured to carry out the step of:
    terminating the particular activity when an amount of storage space that can be provided is less than the desired amount of storage space beyond a particular threshold.

6. The at least one non-transitory computer readable storage medium of claim 1, wherein the respective amounts of data for the one or more applications are offloaded to a cloud service in conjunction with being deleted.

7. The at least one non-transitory computer readable storage medium of claim 1, wherein the subsystem storage space manager executes on a computing device that is distinct from the user device.

8. The at least one non-transitory computer readable storage medium of claim 1, wherein the subsystem storage space manager is further configured to carry out the step of:
identifying a subset of applications of the plurality of applications that are active on the user device.

9. The at least one non-transitory computer readable storage medium of claim 1, wherein at least two applications of the plurality of applications are grouped together to establish at least one group of applications, and each application of the at least one group of applications utilizes a same portion of storage space within the user device.

10. The at least one non-transitory computer readable storage medium of claim 9, wherein the subsystem storage space manager is further configured to carry out the steps of:
identifying, among the at least one group of applications, a group of applications in which a subset of applications of the group of applications is active on the user device; and
disregarding each application in the group of applications as an application for which an amount of its respective data can be deleted.

11. The at least one non-transitory computer readable storage medium of claim 1, wherein the protocol comprises at least one of:
(i) allowing the subsystem storage space manager to control storage space on behalf of the one or more applications,
(ii) designating a specific storage space in memory for use by the one or more applications, or
(iii) requiring a first application and a second application of the one or more applications to share the specific storage space.

12. A method for dynamically managing available storage space within a user device, the method comprising, at a subsystem storage space manager to a system storage space manager:
receiving a storage space deletion request from the system storage space manager, wherein the storage space deletion request indicates an amount of storage space to be freed on the user device;
identifying, among a plurality of applications, one or more applications whose respective data can be deleted, wherein:
the one or more applications are identified by way of a protocol that is defined by the system storage space manager and that is implemented by each application of the one or more applications, and
each application of the one or more applications registers with the subsystem storage space manager and agrees to abide by the protocol;
issuing, by way of the protocol, and for each application of the one or more applications, a respective deletion request that, when executed, causes a respective amount of the respective data of the application to be deleted without requiring an involvement of the application, wherein:
the respective amounts of respective data, when deleted, cause at least the amount of storage space to be freed on the user device, and
at least one application of the one or more applications is not executing on the user device when its respective data is deleted.

13. The method of claim 12, wherein the subsystem storage space manager acts as a proxy service to manage storage space on behalf of the plurality of applications, and each application of the plurality of applications relies on the subsystem storage space manager to carry out storage space management operations.

14. The method of claim 12, further comprising:
identifying a subset of applications of the plurality of applications that are active on the user device.

15. The method of claim 12, further comprising, at either the subsystem storage space manager or the system storage space manager:
receiving a request for a desired amount of storage space to be made available for a particular activity;
monitoring available storage space within the user device to determine whether the desired amount of storage space can be provided; and
when the desired amount of storage space can be provided:
facilitating a deletion process that causes the desired amount of storage space to be made available for the particular activity.

16. The method of claim 15, further comprising:
terminating the particular activity when an amount of storage space that can be provided is less than the desired amount of storage space beyond a particular threshold.

17. The method of claim 12, wherein the protocol comprises at least one of:
(i) allowing the subsystem storage space manager to control storage space on behalf of the one or more applications,
(ii) designating a specific storage space in memory for use by the one or more applications, or
(iii) requiring a first application and a second application of the one or more applications to share the specific storage space.

18. A user device, comprising:
at least one processor; and
at least one memory storing instructions that, when executed by the at least one processor, cause the user device to implement a subsystem storage space manager to a system storage space manager that carries out steps that include:
receiving a storage space deletion request from the system storage space manager, wherein the storage space deletion request indicates an amount of storage space to be freed on the user device;
identifying, among a plurality of applications, one or more applications whose respective data can be deleted, wherein:
the one or more applications are identified by way of a protocol that is defined by the system storage space manager and that is implemented by each application of the one or more applications, and
each application of the one or more applications registers with the subsystem storage space manager and agrees to abide by the protocol;
issuing, by way of the protocol, and for each application of the one or more applications, a respective deletion request that, when executed, causes a respective amount of the respective data of the application to be deleted without requiring an involvement of the application, wherein:

the respective amounts of respective data, when deleted, cause at least the amount of storage space to be freed on the user device, and at least one application of the one or more applications is not executing on the user device when its respective data is deleted.

19. The user device of claim 18, wherein the subsystem storage space manager acts as a proxy service to manage storage space on behalf of the plurality of applications, and each application of the plurality of applications relies on the subsystem storage space manager to carry out storage space management operations.

20. The user device of claim 18, wherein the protocol comprises at least one of:
   (i) allowing the subsystem storage space manager to control storage space on behalf of the one or more applications,
   (ii) designating a specific storage space in memory for use by the one or more applications, or
   (iii) requiring a first application and a second application of the one or more applications to share the specific storage space.

* * * * *